UNITED STATES PATENT OFFICE.

JACOB REESE, OF PITTSBURG, PENNSYLVANIA.

IMPROVEMENT IN THE MANUFACTURE OF IRON AND STEEL.

Specification forming part of Letters Patent No. 193,551, dated July 24, 1877; application filed June 21, 1875.

*To all whom it may concern:*

Be it known that I, JACOB REESE, of Pittsburg, in the county of Allegheny and State of Pennsylvania, have invented a new and useful Improvement in Manufacture of Iron and Steel; and I do hereby declare the following to be a full, clear, and exact description thereof.

My invention relates to the manufacture of iron and steel by what is termed the "Bessemer process," wherein the fluid molten metal is treated in a converter by air-blasts, which oxidize the oxidizable substances present, decarburizing the metal, which is subsequently recarburized by the addition of spiegeleisen.

The Bessemer process, as commonly practiced, consists in melting a charge of four or five tons of pig-iron, either in a cupola or reverberatory furnace, charging the same into a converter which has been previously heated, and then submitting the charge to the action of air-currents forced through the liquid mass, until such a time as the flame indicates that the carbon has been consumed and the metal is decarburized, after which the spiegeleisen is added and the process is finished.

During the first part of the process the reactions are said to be the same as occur in puddling iron—silicates are formed; but at no stage of the process are the sulphur and phosphorus eliminated. Consequently, it has heretofore been found impossible to work an iron containing over 0.2 per cent. of phosphorus and 0.3 per cent. of sulphur, which excludes a large quantity of the pig metal produced in this country. The presence of sulphur in any considerable quanity renders iron "red-short," and phosphorus renders the iron "cold-short"—two conditions well known in the trade, and needing no further explanation.

In treating the crude molten metal in the converter, it has been proposed to introduce oxygen—yielding substance in bulk through the mouth of the converter, and in chambers which should be brought beneath the liquid metal by tilting the converter; but in the first case the substances, being lighter than the metal, would not intermingle with the metal so as to act effectively, and were more or less decomposed by the gases in the converter above the liquid metal. In the latter case the material, being in bulk, will rise through the metal with substantially the result before mentioned. Consequently, the introduction of chemical agents in the treatment of the metal in the converter has been abandoned, and the simple and original process is alone employed.

It is a well-known fact that both sulphur and phosphorus are expelled from the iron in the puddling process, and, consequently, no pig metal is deemed too impure for manipulation in the puddling-furnace; and it has also been clearly shown that the sulphur and phosphorus thus eliminated are found in the slag in the condition of sulphide and phosphide, showing, conclusively, that the puddling process is capable of reducing the amount of phosphorus and sulphur present in the metal, and that those elements are absorbed by the slag, which is principally composed of an oxide of iron. This having been established, the next step is to present the oxide of iron to the metal in the converter in such a manner as to facilitate the action of the oxide on the metal, establishing the conditions existing in the puddling process, which may be done by means of the blast. The oxygen of the iron will then unite with the carbon of the metal, forming carbonic oxide, and the iron, being in a free or "nascent" condition, will be seized upon by the phosphorus and sulphur, entering the slag as sulphide and phosphide of iron.

An important step in the manufacture of steel is to obtain a homogeneous iron as free as possible from silicon, sulphur, and other substances, so that the physical structure of the metal may be in the best condition to receive carbon. The purer the iron the greater the amount of carbon it will take up, it being a well-known fact that the weak Swedish irons and wrought-irons, which resist least tensile and crushing or compressive force, make the best steel, and this I conceive to be due to the greater porosity or the physical structure of the metal, which permits them to absorb and retain a larger amount of carbon.

I therefore subject the metal, while in the converter, to the action of iron oxide, preferably iron-ore oxide, fluorides, chlorides, and like agents, to decarburize the metal and eliminate all foreign matter; and in order that the agents may be brought into intimate contact with all parts of the molten metal, I introduce them by means of the blast and in a divided state, which causes them to be uniformly distributed. The bath of pig in the converter, in its usual condition before treatment, will contain sulphur, silicon, phosphorus, and carbon, alloyed with the iron. Now, in carrying out my process, small portions of pulverized iron-ore oxide are introduced through the blast, sufficient to dephosphorize and desulphurize the molten metal, without materially decarburizing; therefore the metal can be drawn from the converter before decarburization takes place; or, further, ore may be forced into the metal until decarburization takes place, and, still further, until the silicon is eliminated. Thus, it is apparent the use of ore is applicable in three several steps, though, for the purposes of my process, the several steps are combined in one, the transformations being so rapid and closely connected as to render it difficult, even if desirable, to separate them.

In decarburizing by the air-blast alone, a loss of from five (5) to ten (10) per cent. of iron occurs, which loss is materially lessened when the iron-ore oxide is employed. To obtain the best results the ore must be injected in small quantities, as the first effect of injecting the oxide into the metal will be to reduce the temperature, and if a considerable quantity is forced in at any given time, it will chill the metal at the tuyeres, prevent the equal distribution of the blast, and materially affect the blow. By my method I am enabled to distribute the oxide in small quantities, and continuously, until the required amount has been introduced for decarburization, and this without disturbing or deranging the blow.

Having, by the means above specified, obtained a metal in the converter of uniform chemical and physical properties, I proceed to carburize the same by the introduction of carbon in a finely-divided state, and for this purpose I find plumbago best adapted, because of its physical properties, it being flaky and pulverulent, though carbon of a different kind may be substituted therefor; and as the object is to insure its dissemination uniformly throughout the entire body of the metal, which cannot be done with spiegeleisen, or other material introduced from above, I introduce the carbon in a divided or powdered condition into the blast, by which it is carried through the tuyeres into the body of metal in the converter. I am thus enabled to regulate the exact amounts of carbon that the metal in the converter is caused to take up, and the grade of steel produced.

When a steel of desired grade is thus obtained, it may be converted into a chrome-steel, titaniferous steel, or steel of other desired quality, by the introduction of chromium, titanium, or other similar metal, either in a finely-divided state, or as an oxide or a salt, and as the metal thus alloyed with the iron should be presented to the metal of the converter without previous exposure to the deleterious gases, and should be intimately mingled with the metal to obtain the best results, it is introduced by means of the blast, in the manner before mentioned; but it is not necessary that the chromium, titanium, and like substances, be introduced after the metal in the converter has been carburized, for they may be introduced at any stage of the treatment; and, in fact, it is proposed to introduce them, especially the titaniferous ores, which are of a refractory nature, together with iron ore in the early stages of the process, when, having a bath of metal in the converter, the titaniferous and other oxides may be introduced through the blast and reduced, producing titaniferous and other irons and steels.

When the metal operated upon in the converter does not contain the requisite percentage of silicon, I supply the same by means of the blast, and also manganese when such is found desirable, or manganic iron is to be produced.

In carrying out my invention I provide a series of chambers for containing the agents and feeding them into the blast-pipes, said chambers being attached to the pipes and provided with suitable valves, which control the openings between the chambers and pipes, and with equalizing-tubes extending from the top of the agent-chamber to the blast-pipe to equalize the pressure; but I do not claim such devices, nor confine myself thereto.

These chambers will, in general, correspond in number to the number of agents employed, though two or more substances may be discharged into the blast from the same chamber, when their presence in the liquid metal at the same instant is desired or not contra-indicated.

When the metal is melted and run into the converter, as in the usual manner of making Bessemer steel, (one of the agent-chambers having been previously filled with powdered oxide of iron,) the converter is turned up, and the blast is blown through it at a pressure of about twenty-five pounds to the square inch, the valve of the agent-chamber is slightly opened, and a small quantity of the powdered ore is admitted to the blast-pipe; and is carried by the blast forward and upward into the metal. The oxide is immediately decomposed, the oxygen uniting with the carbon of the metal, forming carbonic oxide, while the iron, being in a free or "nascent" state, unites with the sulphur and phosphorus, and causes them to pass into the slag. When silicon is present the oxygen of the oxide unites with it, forming silicates, which unite with the sulphides and phosphides, forming a slag, which will be found to contain the silicate, phosphide, and sulphide of iron.

When the metal has been thus thoroughly decarburized—the silicon, sulphur, and phosphorus removed—it will be found to be homogeneous iron; and if that quality of metal is desired, it is emptied into ingot-molds, and is ready to be rolled into wrought-iron; but if steel is desired, the valve of the ore-chamber is closed, and the valve of a second similar chamber (the carbon-chamber) is opened, and a quantity of fine plumbago is admitted to the blast, being carried up thereby, and disseminated throughout the mass of metal in the converter, in like manner as the ore. As soon as the metal has been sufficiently carburized, the valve of the second chamber is closed.

In purifying the metal, previous to its carburization, I also employ, at times, such agents as common salt, saltpeter, carbonate of potash, as indicated by the nature of the metal operated on, and for the introduction of which agents separate agent-chambers may be provided.

Manganese, chromium, titanium, tungsten, and other metals are introduced into the blast in the production of chrome-steel, titaniferous steel, and the like, either at the time the metal is first operated upon—that is, before the carburization—or after it has been carburized.

The oxide of manganese, if blown in while carbon is present, will be reduced, the oxygen uniting with the carbon, forming carbonic oxide, which will leave the manganese in a free state.

The admixture of titanium with iron produces a desirable quality of steel; but titaniferous iron, though abundant, has not heretofore been much employed, owing to its refractory character. At the high heat of the converter it is readily reduced, the oxygen uniting with the carbon of the metal, leaving the titanium and iron in the metallic state, thus securing the titaniferous steel, which will stand high heat and resist great tensile and compressive strain.

What is said of titanium may be equally well said of chromium and other metals; and thus it will be apparent that, by my manner of introducing the agents, I am enabled to produce any of the alloys of iron with the metals specified.

In the Bessemer process, as at present practiced, a portion of the sulphur and phosphorus has been disengaged from the iron at the close of the blow, and floats on the surface of the iron, with the slag, as sulphide and phosphide of iron; but when the spiegeleisen is poured in from above, it comes in contact with this slag, and carries the sulphur and phosphorus back into the metal. To overcome this difficulty, as well as to obtain a better quality and a more thorough distribution of the carbon throughout the metal, I introduce the plumbago, as before stated.

By the method herein specified I am enabled to so purify and refine the metal in the Bessemer converter as to produce a perfectly-homogeneous structure of the iron, and by then introducing carbon, as explained, I am enabled to thoroughly distribute the carbon in the metal, securing all the conditions of the crucible process, and producing a steel equal in quality to that made by the crucible process, and known as "crucible cast-steel."

I make no alterations of the Bessemer plant, merely attaching the agent-chambers to the blast-pipes between the blowing-cylinders and the converter; nor do I change the amount of the charge or the time of treating the same.

Having thus described my invention, what I claim, and desire to secure by Letters Patent, is—

1. The process herein described of treating the metal in the converter by introducing iron-ore oxide in a divided state continuously, and by means of the air or other oxygen-yielding blast, until decarburization is effected, substantially as and for the purpose specified.

2. The process herein described of recarbonizing iron in the converter, by introducing plumbago in a divided state, and by means of the blast, substantially as specified.

3. The process herein described for the manufacture of steel, consisting in first purifying and decarbonizing the metal in the converter by the introduction of iron-ore oxide, and then recarburizing the metal by the introduction of plumbago by means of the blast, substantially as specified.

In testimony whereof I, the said JACOB REESE, have hereunto set my hand.

JACOB REESE.

Witnesses:
F. W. RITTER, Jr.,
T. B. KERR.